Dec. 7, 1965   E. A. BILODEAU   3,221,383
CINCHING DEVICE
Filed July 9, 1964
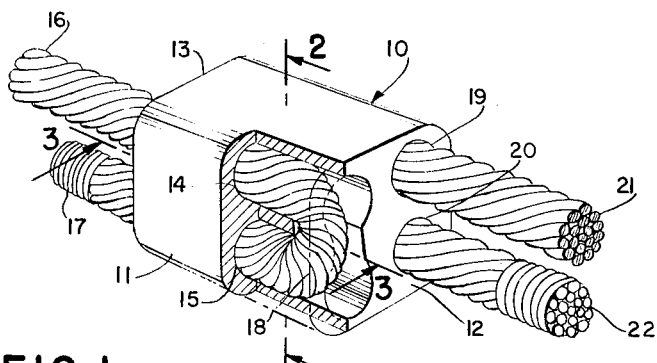
FIG.I.
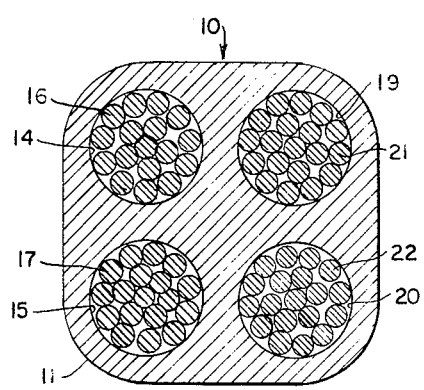
FIG.2.
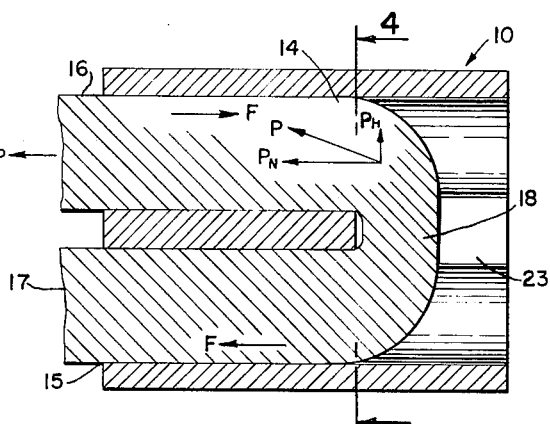
FIG.3.
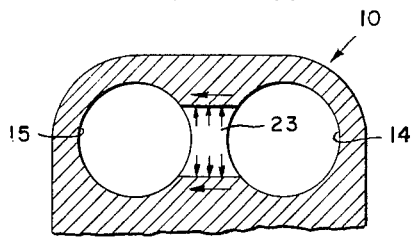
FIG.4.
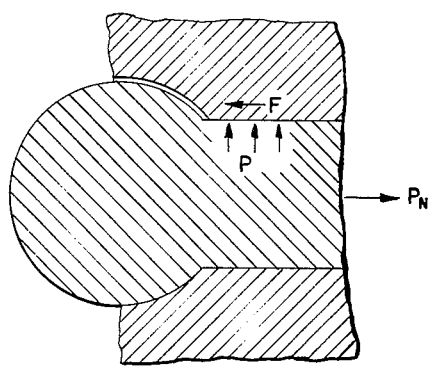
FIG.5.
INVENTOR
Eugene A. Bilodeau
BY
Holcombe, Wetherill & Brisebois
ATTORNEYS

United States Patent Office 3,221,383
Patented Dec. 7, 1965

3,221,383
CINCHING DEVICE
Eugene A. Bilodeau, 45 Sheridan St., Barre, Vt.
Filed July 9, 1964, Ser. No. 381,450
2 Claims. (Cl. 24—129)

This invention relates to a rope cinching device and more in particular to a means for retaining a rope within the device, or to retain two ends of the same rope in fixed relation within the device.

Heretofore devices have been made for holding a rope, particularly wire rope, in fixed relation to another portion of the rope. These devices usually employ some type of clamping action where pressure is brought on the rope to create a friction necessary to prevent slippage. Hemp rope may be employed in certain types of devices that employ a clamping action, such as shown in Peck Patent 436,315, where a wedge and ring are used to retain the standing portion of the rope, or an adjustable button device, such as is described in Gibbs Patent 51,582, which relies on the friction quality of hemp.

The use of modern synthetic fibers such as nylon, dacron, orlon, etc. require special devices to hold rope made of these fibers, because of the low coefficient of friction between the holding device and the rope.

It is an object of the present invention to provide a cinching device for rope that employs a crimping action in combination with encasement to prevent rope slippage under all conditions, either under severe tension or no tension.

It is a further object of the present invention to provide a device that employs a crimping action that will increase its retention of the rope as more tension is placed on the rope.

It is a still further object of this invention to provide a device that will hold a rope under tension and will not release the same when the tension is released.

These and other objects will be apparent from the following examples and drawings, which are given for the purpose of illustration only and are not limitations upon the invention.

In the drawings:

FIGURE 1 is a perspective view of a cinching device, partially in section.

FIG. 2 is a sectional view on line 2—2 of FIG. 1.
FIG. 3 is a sectional view on line 3—3 of FIG. 1.
FIG. 4 is a sectional view on line 4—4 of FIG. 3.
FIG. 5 is an enlarged fragmentary view of FIG. 4.

Referring to the drawings, FIGURES 1 to 5 inclusive show a cinching device 10 which comprises a block 11 having four side faces and end faces 12 and 13. A passageway 14, between the end faces 12 and 13 is provided in the upper part of this block. Adjacent thereto and parallel therewith is a second passageway 15. At one end of the block the wall between the passageways 14 and 15 is cut away to form an opening 23 therebetween, shown in FIG. 4. The standing portion 16, of a rope is passed through the passage 14 and the free end 17 is returned through the associated passage 15 so that the crimp occurring at the returned portion 18 retains the rope and prevents slippage.

The cinching device 10 comprising the block 11, may have a second set of passages 19 and 20 therethrough to encase the standing portion 21 of a rope. The passage 20 adjacent the passage 19 and parallel therewith receives and encases the free end portion 22 of the rope, of which 21 is the standing portion. The standing portions 16 and 21 may be of the same or different ropes and in use the device may be used to retain one end of a rope, or it may be used to fasten two ropes together, or to fasten two ends of the same rope together.

The block 11 may be made of wood, steel, aluminum, or plastic, but a readily moldable plastic, such as nylon or polyethylene is preferred.

In operation, a rope having a standing portion 16, of slightly smaller diameter than the passageway 14 and a larger diameter than the width of slot 23 is passed therethrough and encased in passageway 15. A crimping action is thus applied to the rope 16 at the return portion 18, by the action of slot 23 as shown in FIGS. 1, 3 and 5. This crimping action and encasement within the opening prevents the rope from slipping under all conditions.

The unique manner in which the crimp is placed upon the rope causes tension to actually tighten the crimping action.

When the standing portion 16 is passed through the passage 14, as shown in FIG. 3, and the free end 17 is returned through the pasage 15, and if then a pulling force P is applied to the standing end of this rope the following occurs:

This pulling force P changes its direction slightly due to action within the fibers of the rope. It tends to bend around with the bend in the rope. This is much like a rope around a pulley. At some point, however, the force P is resisted and slipping is prevented. The angle the resultant force P assumes from the original force P depends upon many factors but it does nevertheless exist. At this point, using the original direction of force P as a vertical axis, this resultant can be described by its components P$v$ and P$h$. The force P$v$, then, tends to pull the rope down against the bottom of slot 23, while the force P$h$ tends to pull the rope out of slot 23. This horizontal force is the force which must be resisted to prevent slippage. As the force P$h$ tends to cause slippage, such failure is prevented by friction against the walls of slot 23 by the rope, and, more importantly, by the mechanical action set up as the "wide" rope meets the edge of the "narrow" slot 23, as shown in FIGURE 5. It is noted, as shown in FIG. 3, that the force P$v$ causes a flattening in the rope at the return portion. This in turn causes a widening of the rope outside of slot 23, and the greater the force the more is the flattening. This, thereby, causes a better mechanical stoppage at the edge of slot 23. Thus the unique location of the slot creates a situation which not only prevents slippage caused by the force P$h$ but which actually uses the much greater component of the force, namely P$v$, to assist in making the device more effective.

Devices of this type are particularly useful in repairing of broken lines of any type especially those of small sailing craft where this device might be used as an emergency measure, and in fastening tags to cows where there is little tension on a rope, but which rope may be subjected to extensive tension if the tag becomes fouled with some other object.

What is claimed is:

1. A device for retaining at least one rope in fixed position which comprises; an elongated block having a passage therethrough slightly larger in diameter than the diameter of said rope, a return passage adjacent to said first passage and parallel to said first passage, a cut-out portion connecting said first passage and said return passage, said cut-out portion being slightly less in width than the diameter of said rope, at least a third and fourth passage through said block parallel to said first and second passage, a cut-out portion connecting said third and fourth passages, said cut-out portion being slightly less in width than the diameter of said rope, said cut-out portion being located at the opposite end of said block in said first cut-out portion all passages being longitudinal, through passages parallel to each other of uniform dimension, each cut-out being of less dimension than its adjacent passages adapted to receive and hold said rope.

2. A device for retaining at least one rope in a fixed position, which comprises; an elongated block having a passage therethrough slightly larger in diameter than the diameter of said rope, a return passage adjacent to said first passage, a cut-out portion connecting said first passage and said return passage, said cut-out portion being slightly less in width than the diameter of said rope, at least a third and fourth passage through said block, a cut-out portion connecting said third and fourth passage, said cut-out portion being slightly less in width than the diameter of said rope, all passages being through passages of uniform dimension, each cut-out portion being of less diameter than its adjacent passages and adapted to receive and hold said rope.

References Cited by the Examiner

UNITED STATES PATENTS

| | | | |
|---|---|---|---|
| 1,083,958 | 1/1914 | Tod | 24—129 |
| 2,449,235 | 9/1948 | Krupp | 24—130 |
| 2,827,617 | 3/1958 | Odegaard | 339—105 X |
| 3,050,803 | 8/1962 | Hulterstrum | 24—129 |
| 3,196,379 | 7/1965 | Sams | 339—100 |

WILLIAM FELDMAN, *Primary Examiner.*

B. A. GELAK, *Examiner.*